US012037966B2

(12) United States Patent
Zope et al.

(10) Patent No.: US 12,037,966 B2
(45) Date of Patent: Jul. 16, 2024

(54) AIR INTAKE SYSTEM AND VEHICLE

(71) Applicant: FLEETGUARD FILTERS PRIVATE LIMITED, Pune (IN)

(72) Inventors: Kalidas Mahesh Zope, Pune (IN); Tarun Harivanshlal Dham, Pune (IN); Mahantesh S Kale, Pune (IN)

( * ) Notice: Subject to any disclaimer, the term of this patent is extended or adjusted under 35 U.S.C. 154(b) by 91 days.

(21) Appl. No.: 17/787,913

(22) PCT Filed: Dec. 30, 2020

(86) PCT No.: PCT/IB2020/062541
§ 371 (c)(1),
(2) Date: Jun. 21, 2022

(87) PCT Pub. No.: WO2021/137168
PCT Pub. Date: Jul. 8, 2021

(65) Prior Publication Data

US 2023/0035209 A1 Feb. 2, 2023

(51) Int. Cl.
*F02M 35/10* (2006.01)
*F02M 35/02* (2006.01)

(52) U.S. Cl.
CPC .. *F02M 35/10013* (2013.01); *F02M 35/0216* (2013.01); *F02M 35/10091* (2013.01); *F02M 35/10157* (2013.01); *F02M 35/10262* (2013.01); *F02M 35/1038* (2013.01); *F02M 35/10386* (2013.01)

(58) Field of Classification Search
CPC ......... F02M 35/10013; F02M 35/0216; F02M 35/10091; F02M 35/10157; F02M 35/10262; F02M 35/1038; F02M 35/10386
See application file for complete search history.

(56) References Cited

U.S. PATENT DOCUMENTS 4,366,878 A * 1/1983 Warf ...................... B60K 13/02 55/385.3
11,752,860 B2 * 9/2023 Fields .................. B60G 15/065 296/64
2008/0236533 A1 * 10/2008 Schwingenschlogl ...................... F02M 35/164 123/184.21

FOREIGN PATENT DOCUMENTS

CN 108518291 A * 9/2018
CN 108518291 A 9/2018
CN 209557136 U * 10/2019
CN 209557136 U 10/2019

* cited by examiner

*Primary Examiner* — Syed O Hasan

(57) ABSTRACT

An air intake system (100") for vehicle is provided. The air intake system (100") includes an air filter assembly (108), and an air conduit (101). The air filter assembly (108) includes a first part mounted to a frame of the vehicle, and a second part mounted to a chassis of the vehicle. The first part and second part are arranged in such a manner that the attachment of the frame and the chassis together causes assembly of the first part and second part of the air filter assembly (108). The air conduit (101) includes an inlet end (103) and an outlet end (105), and coupled to a turbocharger. The air conduit (101) extends horizontally between the inlet end (103) and the outlet end (105) and comprises a plurality of segments such that a first segment bends at predefined angles to couple to a second segment of the plurality of segments.

20 Claims, 12 Drawing Sheets

AIR INTAKE SYSTEM AND VEHICLE

TECHNICAL FIELD

The present invention relates generally to the field of air filters, and more specifically, to an air intake system for a vehicle.

BACKGROUND

All vehicle's internal combustion engine requires an efficient and easy to maintain air intake system. The most essential part of the air intake system is an air filter assembly fitted to provide clean air for efficient combustion inside the internal combustion engine. Further, the air intake system is an assembly of an air pre-cleaner, an air cleaner and an air conduit. The air intake system in a vehicle provides filtered air to an Internal Combustion (IC) engine. To provide the filtered air, the air intake system absorbs the air from atmosphere, cleans it and flows the filtered air into the IC engine through the air conduit. Upon ingress of the filtered air into the IC engine, oxygen in the filtered air interacts with fuel in the IC engine to facilitate the combustion of the fuel. The filtered air needs to be provided to the IC engine at a pre-determined air pressure to obtain optimum fuel combustion.

Typically, any air filter assembly's design must fulfill two criteria. The first criterion is ease of assembly and the second criterion is ease of maintenance. The ease of assembly criterion requires that all parts must be easily assembled without any performance issues. The maintenance criterion requires easy access to various sub-assemblies of the filter assembly for long-term maintenance.

Generally, the air intake system is provided behind a cabin of the vehicle. However, when placed behind the cabin, the air intake system is exposed to external environment and is vulnerable to damage. Accordingly, to overcome the problem of exposed air intake system, the air intake system may be placed below the cabin. However, space below the cabin already houses the IC engine and other auxiliary parts, and therefore there is a scarcity of space below the cabin to house the air conduit, amounting to a restriction on structure of the air conduit. Additionally, number and angle of curves in the air conduit is directly proportional to resistance encountered by the filtered air while flowing through the air conduit, amounting to a direct relation with pressure drop of the filtered air. Thus, structure of the air conduit placed below the cabin requires optimization of filtered air pressure and space utilization.

Accordingly, a need exists for a structure of the air conduit, placed below the cabin that maintains the air pressure in the air conduit, while safely housing the air conduit in confined space

SUMMARY

Embodiments of the present disclosure present technological improvements as solutions to one or more of the above-mentioned technical problems recognized by the inventor(s) in conventional systems.

Before the present invention relating to an air intake system for a vehicle, it is to be understood that this application is not limited to the particular system(s) and methodologies described, as there can be multiple possible embodiments which are not expressly illustrated in the present disclosure. It is also to be understood that the terminology used in the description is for the purpose of describing the implementations or versions or embodiments only and is not intended to limit the scope of the present invention.

This summary is provided to introduce aspects related to an air intake system for a vehicle. This summary is not intended to identify essential features of the claimed subject matter nor is it intended for use in determining or limiting the scope of the present invention.

In one embodiment, an air intake system for vehicle is provided. The air intake system includes an air filter assembly, and an air conduit. Further, the air filter assembly includes a first part of the air filter assembly mounted to a frame of the vehicle and a second part of the air filter assembly mounted to a chassis of the vehicle. The arrangement of the first part and second part is provided in such a manner that the attachment of the frame and the chassis together causes assembly of the first part and the second part of the air filter assembly. Furthermore, the air conduit as included in the air intake system comprises an inlet end coupled to an air filter and an outlet end, opposite of the inlet end, and coupled to a turbocharger. Further, the air conduit extends horizontally between the inlet end and the outlet end and includes a plurality of segments such that a first segment of the plurality of segments bends at one or more predefined angles to couple to a second segment of the plurality of segments.

In another embodiment, air intake system having an air filter assembly for a vehicle having a frame and a chassis is provided. The air filter assembly comprises a modular snorkel system mounted to the frame of the vehicle and an integrated pre-cleaner and air filter assembly. The modular snorkel system comprises an air entry duct and a hump hose coupled to the bottom of the air entry duct. The integrated pre-cleaner and air filter assembly comprises a twin pre-cleaner design and a guide cone mounted on the top of the twin pre-cleaner design. The guide cone comprises a conical cage-like structure. The guide cone causes the alignment of the hump hose during assembly when the frame and the chassis of the vehicle are being attached together.

In another embodiment, the guide cone further comprises a plurality of mounting points provided at the base of the conical cage-like structure to enable mounting of the guide cone above the twin pre-cleaner design.

In another embodiment, the conical cage-like structure includes an upper guide cone and a lower guide cone formed integrally and a plurality of vertical and horizontal reinforcements.

In another embodiment, a vehicle is provided. The vehicle comprises a frame, a chassis configured to attach to the frame, an air filter assembly and an air conduit. Further, the air filter assembly includes a first part of the air filter assembly mounted to a frame of the vehicle and a second part of the air filter assembly mounted to a chassis of the vehicle. The arrangement of the first part and second part is provided in such a manner that the attachment of the frame and the chassis together causes assembly of the first part and the second part of the air filter assembly. Furthermore, the air conduit as included in the air intake system comprises an inlet end coupled to an air filter and an outlet end, opposite of the inlet end, and coupled to a turbocharger. Further, the air conduit extends horizontally between the inlet end and the outlet end and includes a plurality of segments such that a first segment of the plurality of segments bends at one or more predefined angles to couple to a second segment of the plurality of segments.

In another embodiment, an air filter assembly having a first part and a second part with enhanced ease of assembly and ease of maintenance is provided.

In yet another embodiment, the first part comprises a modular snorkel system. The modular snorkel system comprising an air entry duct; and a hump hose coupled to the bottom of the air entry duct.

In yet another embodiment, the second part comprises an integrated pre-cleaner and air filter assembly. The integrated pre-cleaner and air filter assembly includes a twin pre-cleaner design and a guide cone mounted on the top of the twin pre-cleaner design. Further, the guide cone includes a conical cage-like structure. Furthermore, the guide cone causes alignment of the hump hose during assembly when the frame and chassis of the vehicle are being attached together.

In yet another embodiment, an air conduit is provided as a single structure with a plurality of demarcations, each demarcation of the plurality of demarcations corresponds to at least one segment of the plurality of segments.

In yet another embodiment, an air conduit is provided with a plurality of physical segments detachably coupled to each other. Further, the first segment of plurality of segments is coupled to the second segment of plurality of segments by one of a hump hose, and a straight hose. Furthermore, the one of the first segment and the second segment of the plurality of segments has a length in a range from 300 mm to 1000 mm. Furthermore, at least one segment of the plurality of segments is in one of “Z” shape, “L” shape, “S” shape, and skewed “S” shape.

In yet another embodiment, at least one segment of the plurality of segments has one or more sensors and one or more compressor ports mounted thereon. Further, the one or more sensors includes at least one of: a mass flow sensor, a pressure sensor and a temperature sensor for example.

In yet another embodiment, the air conduit is provided wherein one or more predefined angles are in a range from 20 to 120 degrees. Further, the one or more predefined angles facilitate flow of air in the air conduit at a pressure within a range from 8 inches of water column to 20 inches of water column.

In yet another embodiment, at least one segment of the plurality of segments extends along one of: X axis, Y axis, and Z axis of the air conduit.

In yet another embodiment, the inlet end is coupled to the air filter via a straight hose and the outlet end is coupled to the turbocharger via a hose reducer.

In yet another embodiment, the air conduit is mounted on a chassis of a vehicle by way of one or more brackets and one or more dampers.

BRIEF DESCRIPTION OF THE ACCOMPANYING DRAWINGS

The foregoing detailed description of embodiments is better understood when read in conjunction with the appended drawings. For the purpose of illustrating the disclosure, there is shown in the present document example constructions of the disclosure; however, the disclosure is not limited to the specific system/apparatus or method disclosed in the document and the drawings.

Figure 1:
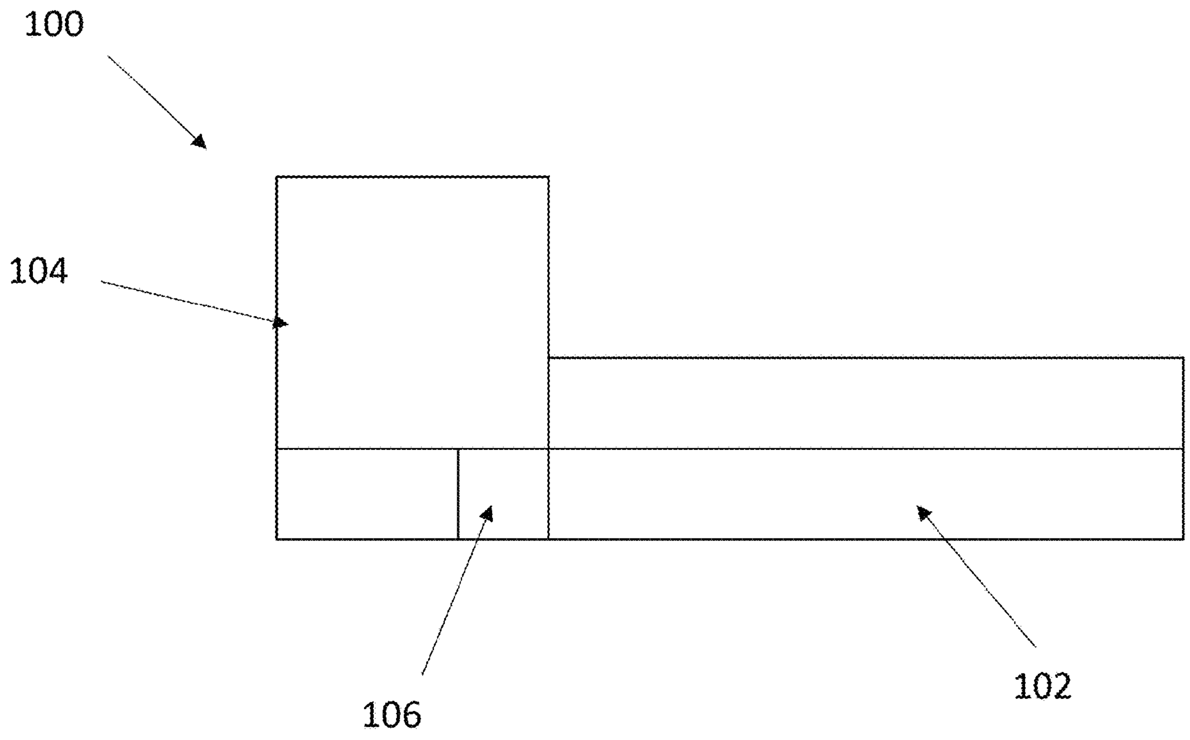
FIG. 1 is a side perspective view depicting a vehicle, in accordance with an embodiment of the present subject matter.

In the above accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

Further, the figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Some embodiments of this disclosure, illustrating all its features, will now be discussed in detail. The words “comprising,” “having,” “containing,” and “including,” and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms “a,” “an,” and “the” include plural references unless the context clearly dictates otherwise. Although an air intake system for a vehicle, similar or equivalent to those described herein can be used in the practice or testing of embodiments of the present disclosure, the exemplary, an air intake system for a vehicle is now described.

In one aspect, embodiments of the present disclosure provide an air intake system for a vehicle. The air intake system includes an air filter assembly, and an air conduit. Further, the air filter assembly includes a first part of the air filter assembly mounted to a frame of the vehicle and a second part of the air filter assembly mounted to a chassis of the vehicle. The arrangement of the first part and second part is provided in such a manner that the attachment of the frame and the chassis together causes assembly of the first part and the second part of the air filter assembly. Furthermore, the air conduit as included in the air intake system comprises an inlet end coupled to an air filter and an outlet end, opposite of the inlet end, and coupled to a turbocharger. Further, the air conduit extends horizontally between the inlet end and the outlet end and includes a plurality of segments such that a first segment of the plurality of segments bends at one or more predefined angles to couple to a second segment of the plurality of segments.

In another embodiment, air intake system having an air filter assembly for a vehicle having a frame and a chassis is provided. The air filter assembly comprises a modular snorkel system mounted to the frame of the vehicle and an integrated pre-cleaner and air filter assembly. The modular snorkel system comprises an air entry duct and a hump hose coupled to the bottom of the air entry duct. The integrated pre-cleaner and air filter assembly comprises a twin pre-cleaner design and a guide cone mounted on the top of the twin pre-cleaner design. The guide cone comprises a conical cage-like structure. The guide cone causes the alignment of the hump hose during assembly when the frame and the chassis of the vehicle are being attached together.

In another embodiment, a vehicle is provided. The vehicle comprises a frame, a chassis configured to attach to the frame, an air filter assembly and an air conduit. Further, the air filter assembly includes a first part of the air filter assembly mounted to a frame of the vehicle and a second part of the air filter assembly mounted to a chassis of the vehicle. The arrangement of the first part and second part is provided in such a manner that the attachment of the frame and the chassis together causes assembly of the first part and the second part of the air filter assembly. Furthermore, the air conduit as included in the air intake system comprises an inlet end coupled to an air filter and an outlet end, opposite of the inlet end, and coupled to a turbocharger. Further, the air conduit extends horizontally between the inlet end and the outlet end and includes a plurality of segments such that a first segment of the plurality of segments bends at one or more predefined angles to couple to a second segment of the plurality of segments.

In another embodiment, a method for assembling an air filter assembly for a vehicle is provided. The vehicle includes a frame and a chassis. The air filter assembly includes a modular snorkel system and an integrated pre-cleaner and air filter assembly. the method comprises a step of assembling the modular snorkel system by coupling a hump hose to the bottom of an air entry duct. The method includes another step of pre-mounting the modular snorkel system to the frame of the vehicle. The method further includes step of assembling the integrated pre-cleaner and air filter assembly by mounting a guide cone on the top of a twin pre-cleaner design. The method also includes the step of mounting the assembled integrated pre-cleaner and air filter assembly to the chassis of the vehicle. The method includes the final step of attaching the frame and the chassis together such that the guide cone of the integrated pre-cleaner and air filter assembly causes alignment of the hump hose during assembly of the modular snorkel system with the integrated pre-cleaner and air filter assembly.

In another embodiment, a method for assembling a vehicle having a frame and a chassis is provided. The method comprises a step of pre-mounting a modular snorkel system to the frame of the vehicle. The method comprises another step of pre-mounting an integrated pre-cleaner and air filter assembly on the chassis of the vehicle. The method further comprises the step of attaching the frame and the chassis together so that the modular snorkel system is assembled with the integrated pre-cleaner and air filter assembly.

Referring now to the drawings, particularly by their reference numbers, FIG. 1 illustrates a vehicle 100 depicted in a side perspective view, in accordance with an embodiment of the present claimed subject matter. The vehicle 100 includes a chassis 102, a frame 104, and an air filter assembly 106. As shown, the chassis 102 and the frame 104 are attached together.

Figure 1A:
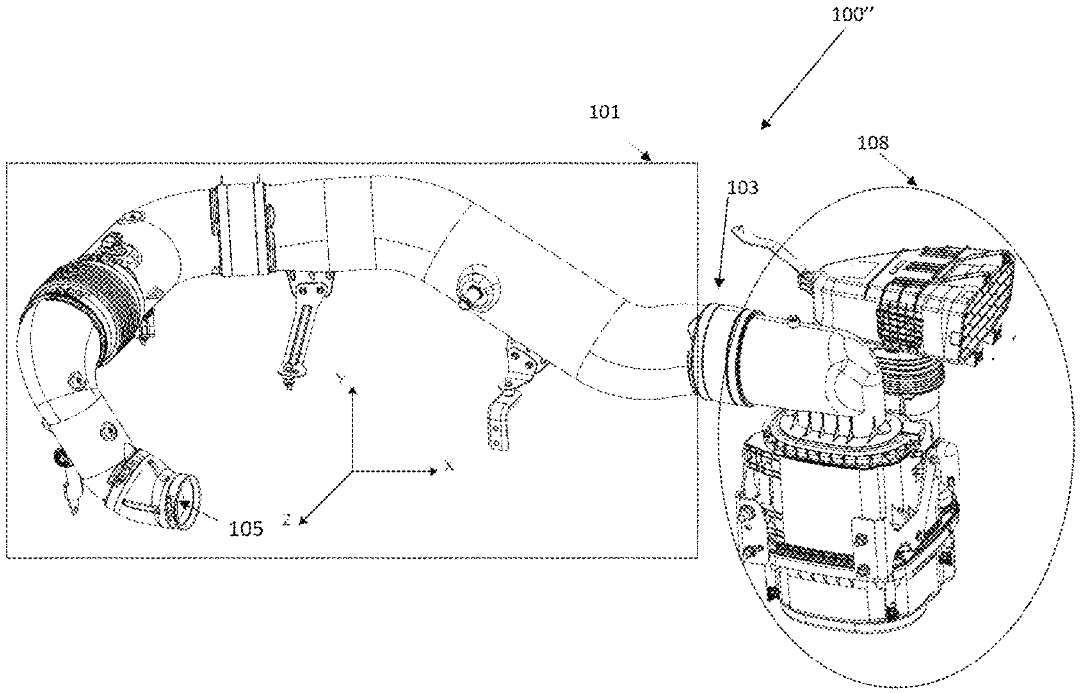
FIG. 1A is an isometric view of an air conduit in an air intake system, in accordance with an embodiment of the present subject matter.

FIG. 1A illustrates an isometric view of an air conduit 101 in an air intake system 100" in accordance with an embodiment of the present invention. A person skilled in the art may understand the air intake system 100" as an assembly of a snorkel, pre-cleaner, a cleaner and the air conduit 101. Further, a combination of the pre-cleaner and the cleaner would be referred to as air filter 108 for purpose of the present claimed subject matter.

In another embodiment, the air conduit 101 may include an inlet end 103 and an outlet end 105. The inlet end 103 may be coupled to the air filter 108 of the air intake system 100". Further, the outlet end 105 may be opposite to the inlet end 103, such that the filtered air from the air filter 108 enters the air conduit 101 via the inlet end 103 and exits via the outlet end 105. Additionally, the outlet end 105 may be coupled to a turbocharger. In an embodiment of the present invention, the air conduit 101 may extend horizontally between the inlet end 103 and the outlet end 105.

In another embodiment, the inlet end 103 may be coupled to the air filter 108 via a straight hose. Further, the outlet end 105 may be coupled to the turbocharger via a hose reducer. In an embodiment of the present invention, the air conduit 101 may be mounted on a chassis of a vehicle by way of one or more brackets and one or more dampers. The bracket is fastened by screw with the chassis. Additionally, a damper may be fastened between the bracket and the chassis. The damper provides a cushioning effect and reduces the vibration of the air conduit 101. The bracket and damper together constitute a mounting assembly. In an embodiment of the present invention, without any limitation the damper may be made of a rubber material and a plastic material. Further, the air conduit 101 may be made of a plastic material, an aluminum material and a steel material.

In another embodiment, the air conduit 101 may be cylindrical in shape. In another embodiment of the present invention, the air conduit 101 may be in shape of a polygon, such as a square or a rectangle.

In another embodiment, the air conduit 101 may include a plurality of segments. In an exemplary embodiment, the air conduit 101 may be a single structure with a plurality of demarcations, each demarcation of the plurality of demarcations corresponds to at least one segment of the plurality of segments. Accordingly, it may be apparent to a person skilled in the art that the air conduit 101 may be molded and manufactured as a single structure, without requirement of any intermediate connectors for intra-conduit coupling.

Thus, physically the air conduit 101 may be understood as a single structure without any physically separate connectors or segments. But, for the sake of reference and understanding, the air conduit 101 may have the plurality of demarcations, such that the plurality of demarcations may represent various sections or portions of the single structured air conduit 101. In an example, the demarcations may be represented by actual markings on the air conduit 101. In another example, the demarcations may be represented by imaginary or notional markings on the air conduit 101. Further, each demarcation of the plurality of demarcations may correspond to at least one segment of the plurality of segments. Since, the air conduit 101 may be a single structure, the plurality of segments may be understood as notional segments, such that physically the plurality of segments are not separate structures but representative of various sections or portions of single structured air conduit 101. Thus, in a scenario when the air conduit 101 is a single structure, the at least one segment of the plurality of segments may be understood as a notional segment.

In another embodiment, the air conduit 101 comprises a plurality of physical segments detachably coupled to each other. Accordingly, it may be apparent to a person skilled in the art that the air conduit 101 may be formed by multiple structures connected to each other by intermediate connectors for intra-conduit coupling. Thus, operationally the air conduit 101 may be understood as a single structure but with physically separate connectors and segments. Thus, in a scenario when the air conduit 101 is not a single structure physically, the at least one segment of the plurality of segments may be understood as a physical segment separate from other segments.

In another embodiment, a first segment of the plurality of segments bends at one or more predefined angles to couple to a second segment of the plurality of segments. Here, the segments may be one of notional and physical segment. In an embodiment of the present invention, the one or more predefined angles are in a range from 20 degrees to 120 degrees. Further, the one or more predefined angles facilitate flow of air in the air conduit 101 at a predefined pressure within a range from 8 inches of water column to 20 inches of water column. Also, the first segment of plurality of segments is coupled to the second segment of plurality of segments by one of: a hump hose and a straight hose, when the segments are physical segments.

In another embodiment, one of: the first segment and the second segment of the plurality of segments has a length in a range from 300 mm to 1000 mm. Further, one of: the first segment and the second segment of the plurality of segments has a diameter in a range from 100 mm to 200 mm.

In another embodiment, at least one segment of the plurality of segments is in one of: "Z" shape, "L" shape, "S" shape, and skewed "S" shape. Further, at least one segment of the plurality of segments extends along one of: X axis, Y axis, and Z axis of the air conduit 101. Here, the segments may be one of notional and physical segment. Also, at least one segment of the plurality of segments has one or more sensors and one or more compressor ports mounted thereon. The one or more sensors include at least one of: a mass flow sensor, a pressure sensor and a temperature sensor.

Thus, the present invention discloses a structure of the air conduit 101, placed below the cabin that maintains the air pressure in the air conduit 101, while safely housing the air conduit 101 in confined space. Specifically, the length, diameter and angle of bending of various segments of the air conduit 101 contribute to a low resistance passage for the filtered air, amounting to maintenance of air pressure. Additionally, the structure disclosed by the present invention is formed to accommodate in confined space between the air filter 108 and the turbocharger, below the cabin of the vehicle. Therefore, the air conduit 101 disclosed in the present invention provides a two-fold advantage of maintaining an optimum pressure of the filtered air and accommodating the air conduit 101 in a confined space.

FIG. 1, and FIG. 1A are merely an example. A person skilled in the art will recognize many variations, alternatives, and modifications of the embodiments of the present claimed subject matter.

Figure 2:
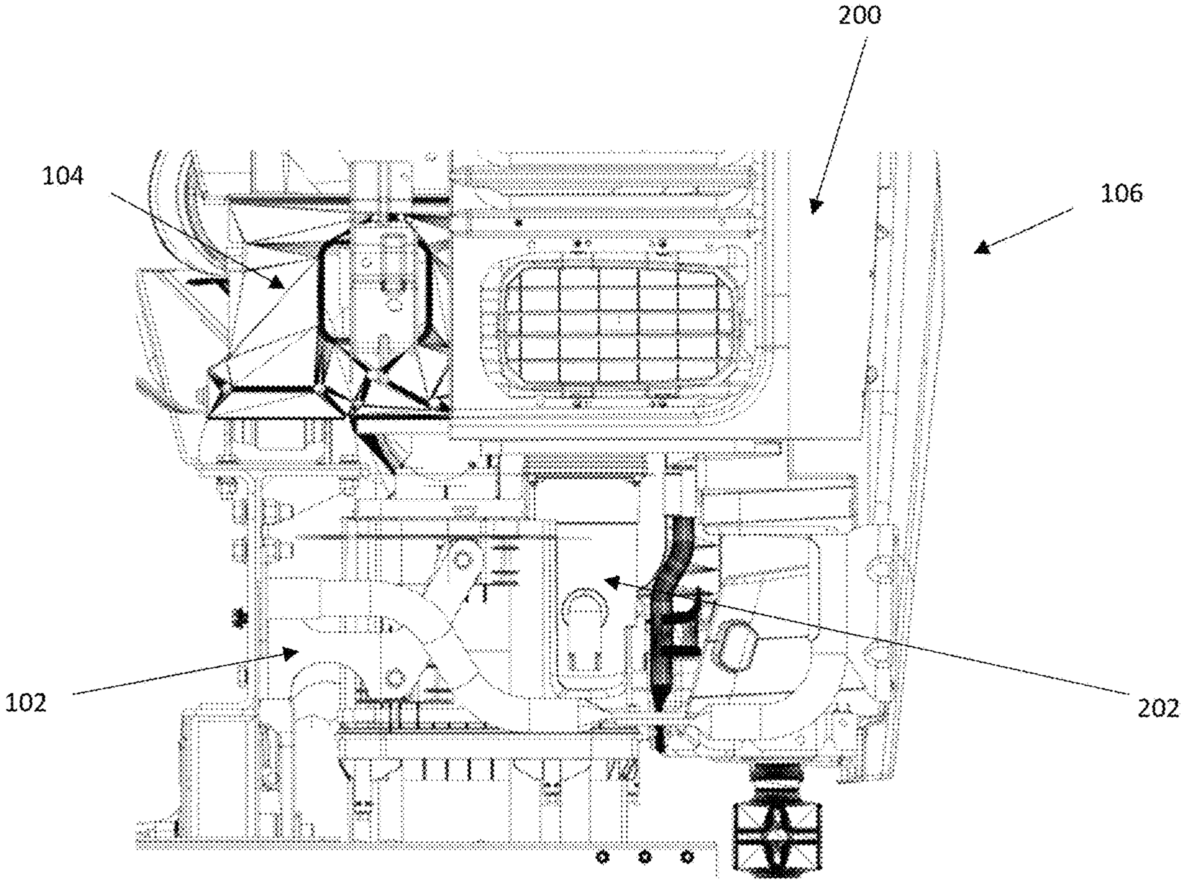
FIG. 2 depicts a zoom-in view of a partial region of the vehicle of FIG. 1, in accordance with an embodiment of the present subject matter.

FIG. 2 depicts a zoom-in view of the air filter assembly 106 of the vehicle 100 depicted in FIG. 1. As illustrated in the view, the air filter assembly 106 comprise a first part 200 and a second part 202. The first part 200 is attached to the frame 104 and the second part 202 is attached to the chassis 102.

Figure 2A:
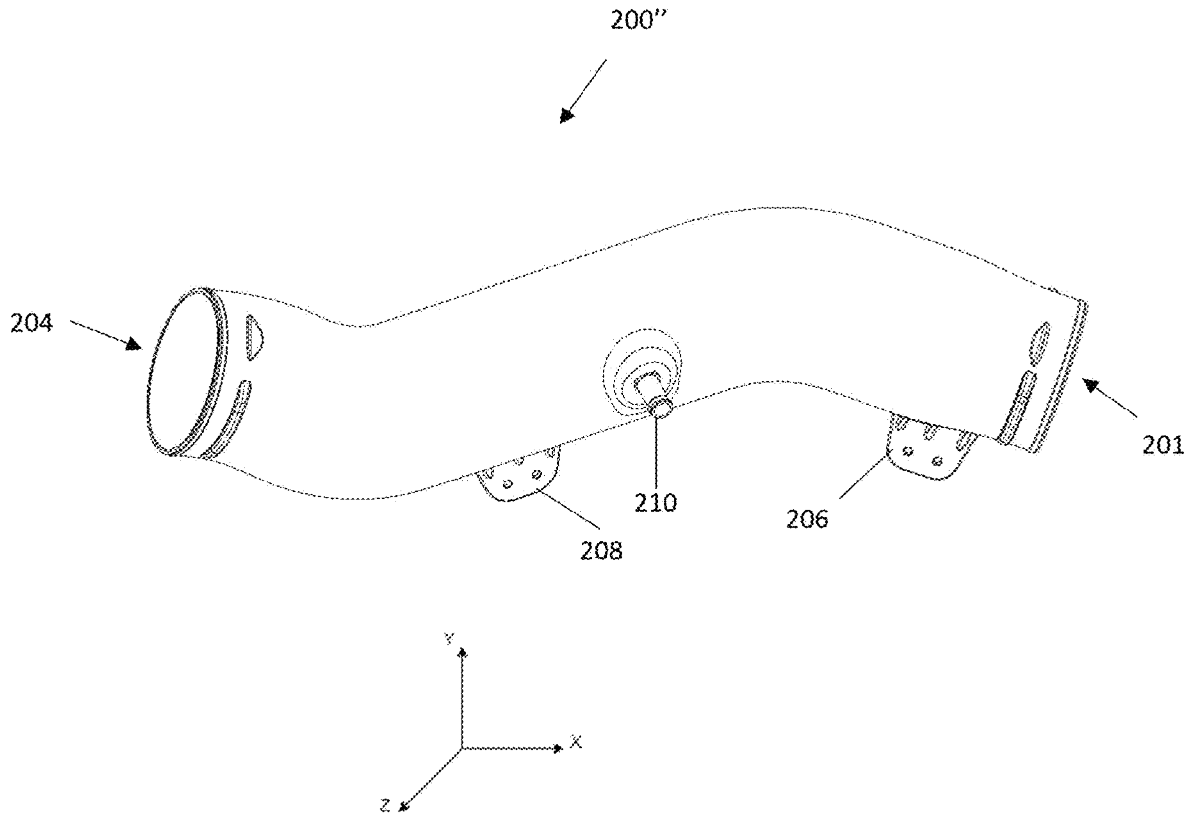
FIG. 2A illustrates a segment of the plurality of segments in the air conduit in an air intake system, in accordance with an embodiment of the present subject matter.

FIG. 2A illustrates a segment of the plurality of segments in the air conduit 101 in accordance with an embodiment of the present invention. Since, the segment of the plurality of segments may be either a notional segment or a physical segment, but for sake of description of FIG. 2A, the segment would be considered as a physical segment and would be referred to as a first section 200".

In an embodiment, the first section 200" of the air conduit 101 may include a first end 201 and a second end 204. The first end 201 may be understood as an inlet end of the first section 200". In a preferred embodiment of the present invention, the first end 201 may be same as the inlet end 103 of the complete air conduit 101, such that the first end 201 may be coupled with the air filet via a first hose. In an embodiment of the present invention, the first hose may be a straight hose.

Further, the first section 200" may extend horizontally along x-axis of the air conduit 101. In an exemplary embodiment of the present invention, the first section 200" may be in shape of an elongated 'Z' with a plurality of curves.

In another embodiment of the present claimed subject matter, the first section 200" may have a length in a range from 300 mm to 1000 mm. In a preferred embodiment of the present claimed subject matter, the first section 200" may have a length of 950 mm. Further, the first section 200" may have a diameter in a range from 100 mm to 200 mm. In a preferred embodiment of the present claimed subject matter, the first section 200" may have a different diameter of the first end 201 and the second end 204, such that the first end 201 of the first section 200" may have a diameter of 180 mm and the second end 204 of the first section 200" may have a diameter of 200 mm. In an embodiment of the present claimed subject matter, the plurality of curves in the first section 200" may have one or more pre-defined angles in a range from 20 degrees to 120 degrees. In a preferred embodiment of the present claimed subject matter, the first section 200" may bend at an angle of 27.5 degrees upwards along x-axis at a distance of 200 mm from the first end 201 and again bends at an angle of 27.5 degrees downwards along x-axis at a distance of 200 mm from the first end 201.

In an embodiment of the present claimed subject matter, the first section 200" may be provided with a first collar 206 and a second collar 208. In an example the first collar 206 and the second collar 208 may be one of: molded, press fitted or fastened by screw with the first section 200" of the air conduit 101. Further, the first collar 206 may be provided at a distance of 820 mm from the second end 204 and the second collar 208 may be provided at a distance of 390 mm from the second end 204 of the first section 200". The first section 200" may additionally be provided with a compressor port 210 at a distance of 480 mm from the second end 204.

In another embodiment of the present claimed subject matter, the second end 204 of the first section 200" may be detachably coupled with a second section 300" of the air conduit 101 via a first hose. In an example, the first hose may be a straight hose. Further, the first hose is coupled to the first section 200" of the air conduit 101 via a clamp. In an embodiment of the present invention the clamp may be a T-clamp.

In an embodiment of the present claimed subject matter, the first section 200" of the air conduit 101 may be mounted on the chassis of the vehicle via one or more brackets. In an example, one end of the bracket may be coupled with the first collar 206 and the second collar 208 and the other end of the bracket may be coupled with the chassis of the vehicle. In an embodiment of the present invention, one or more brackets may be coupled with the first collar 206 and the second collar 208. Further, the bracket may be coupled with the chassis by a screw mechanism. In a preferred embodiment, a damper may be placed between the bracket and the screw mechanism for connection to the chassis of the vehicle via a damper.

FIG. 2, and FIG. 2A are merely an example. A person skilled in the art will recognize many variations, alternatives, and modifications of the embodiments of the present claimed subject matter.

Figure 3:
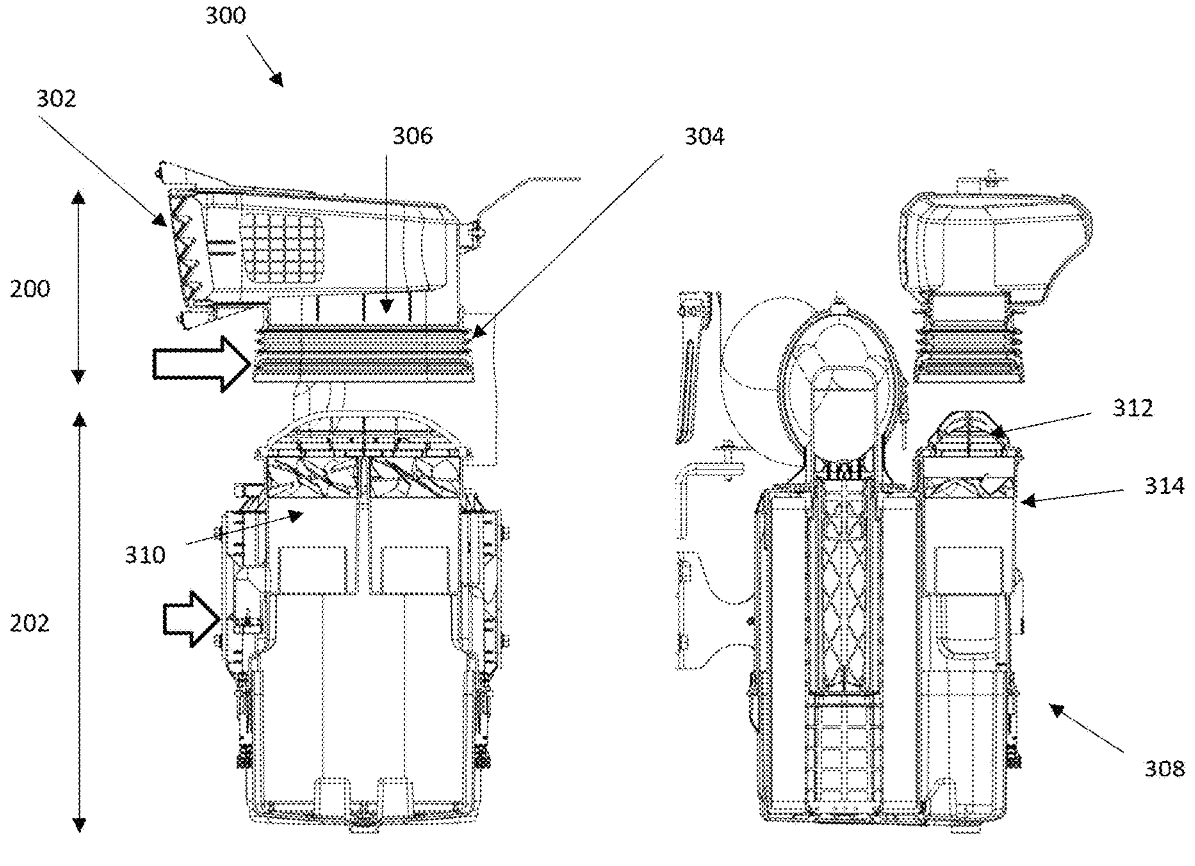
FIG. 3 illustrates front and side perspective views of an air filter assembly in an unassembled state, in accordance with an embodiment of the present subject matter.

Moving on to FIG. 3, front and side perspective views of the air filter assembly 106 in an unassembled state is illustrated. As shown, the first part 200 comprises a modular snorkel system 300. The modular snorkel system 300 comprises an air entry duct 302 and a hump hose 304 coupled to the bottom 306 of the air entry duct 302.

Again, referring to FIG. 3, the second part 202 comprises an integrated pre-cleaner and air filter assembly 308. The integrated pre-cleaner and air filter assembly 308 comprises a twin pre-cleaner design 310 and a guide cone 312 mounted on the top 314 of the twin pre-cleaner design 310. In an embodiment of the present claimed subject matter, the attachment of the frame 104 and the chassis 102 together causes assembly of the first part 200 and the second part 202 of the air filter assembly 106.

Figure 3A:
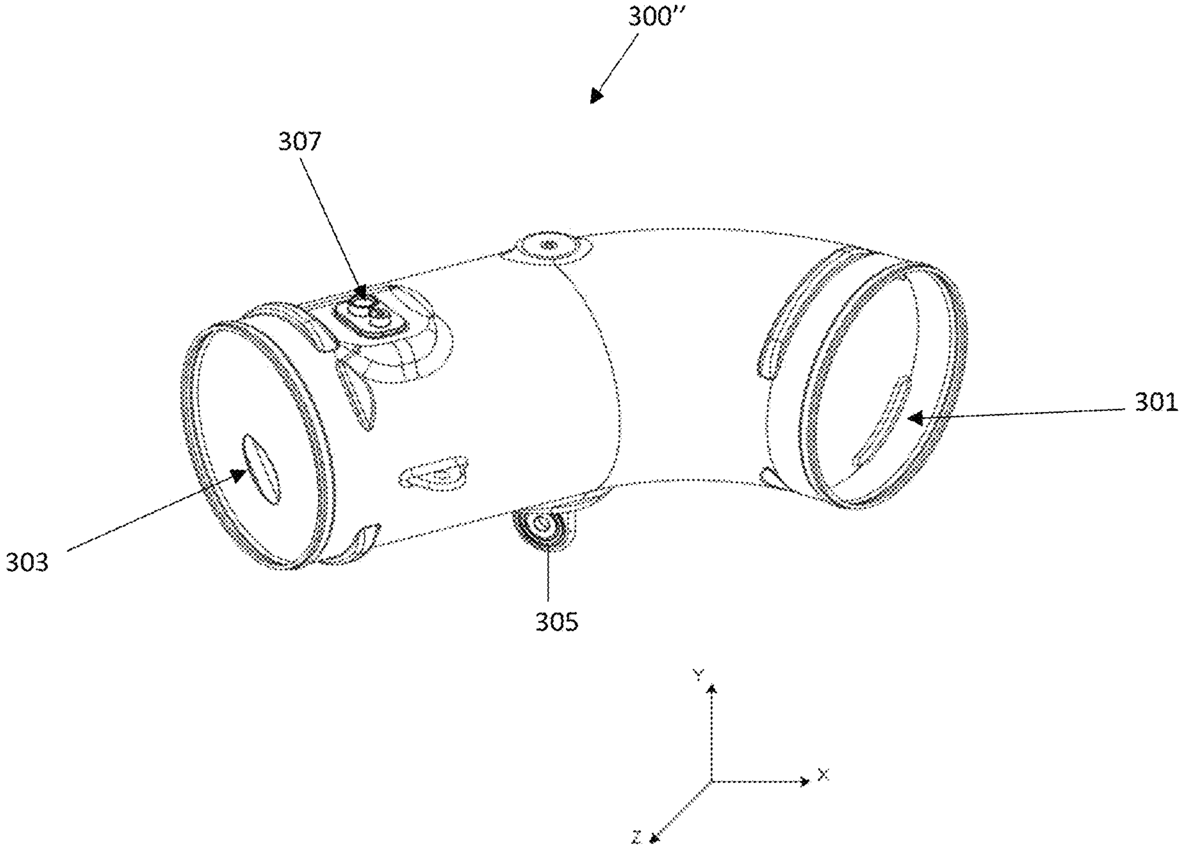
FIG. 3A illustrates a segment of the plurality of segments in the air conduit in an air intake system, in accordance with an embodiment of the present subject matter.

FIG. 3A illustrates a segment of the plurality of segments in the air conduit 101 in accordance with an embodiment of the present claimed subject matter. Since, the segment of the plurality of segments may be either a notional segment or a physical segment, but for sake of description of FIG. 3A, the segment would be considered as a physical segment and would be referred to as a second section 300".

In an embodiment of the present claimed subject matter, the second section 300" of the air conduit 101 may be provided with a third end 301 and a fourth end 303. In an exemplary embodiment, the third end 301 of the second section 300" may be connected with the second end 204 of the first section 200" via a second hose. The second hose may be a straight hose.

Further, the second section 300" may extend horizontally along z-axis of the air conduit 101. In an exemplary embodiment of the present invention, the second section 300" may be in shape of a 'L' or an elbow with a curve.

In another embodiment, the second section 300" may have a length in a range from 300 mm to 1000 mm. In a preferred embodiment of the present claimed subject matter, the second section 300" may have a length of 395 mm. Further, the second section 300" may have a diameter in a range from 100 mm to 200 mm. In a preferred embodiment of the present claimed subject matter, the second section 300" may have a uniform diameter of 180 mm. In an embodiment of the present claimed subject matter, the curve in the second section 300" may have a pre-defined angle in a range from 20 degrees to 120 degrees. In a preferred embodiment of the present claimed subject matter, the second section 300" may bend at an angle of 116.7 degrees along z-axis at a distance of 400 mm from the third end 301.

In another embodiment of the present claimed subject matter, the second section 300" may be provided with a third collar 305. In an example, the third collar 305 may be one of molded, press fitted or fastened by screw with the second section 300" of the air conduit 101. Further, the third collar 305 may be provided at a distance of 217 mm from the fourth end 303 of the second section 300". The second section 300" may additionally be provided with a sensor 307 at a distance of 83 mm from the fourth end 303. In an embodiment, the sensor 307 may determine the pressure of the air flowing via the air conduit 101. In an embodiment of the present claimed subject matter, the sensor 307 may be one of a mass flow sensor 307, a pressure sensor 307 and a temperature sensor 307.

In an embodiment of the present invention, the fourth end 303 of the second section 300" may be detachably coupled with a third section 400" of the air conduit 101 via a third hose. The third hose may be a hump hose. Further, the third hose may be coupled to the second section 300" of the air conduit 101 via a clamp. In an embodiment of the present invention the clamp may be a T-clamp. Furthermore, the second section 300" of the air conduit 101 may be mounted on the chassis of the vehicle via one or more brackets such that one end of the bracket may be coupled with the third collar 305 and the other end may be coupled with the chassis of the vehicle. In an embodiment of the present invention, one or more brackets may be coupled with the third collar 305. Also, the one or more brackets may be coupled to the chassis by a screw mechanism and the one or more brackets may be coupled to the chassis of the vehicle via the damper.

FIG. 3, and FIG. 3A are merely an example. A person skilled in the art will recognize many variations, alternatives, and modifications of the embodiments of the present claimed subject matter.

Figure 4A:
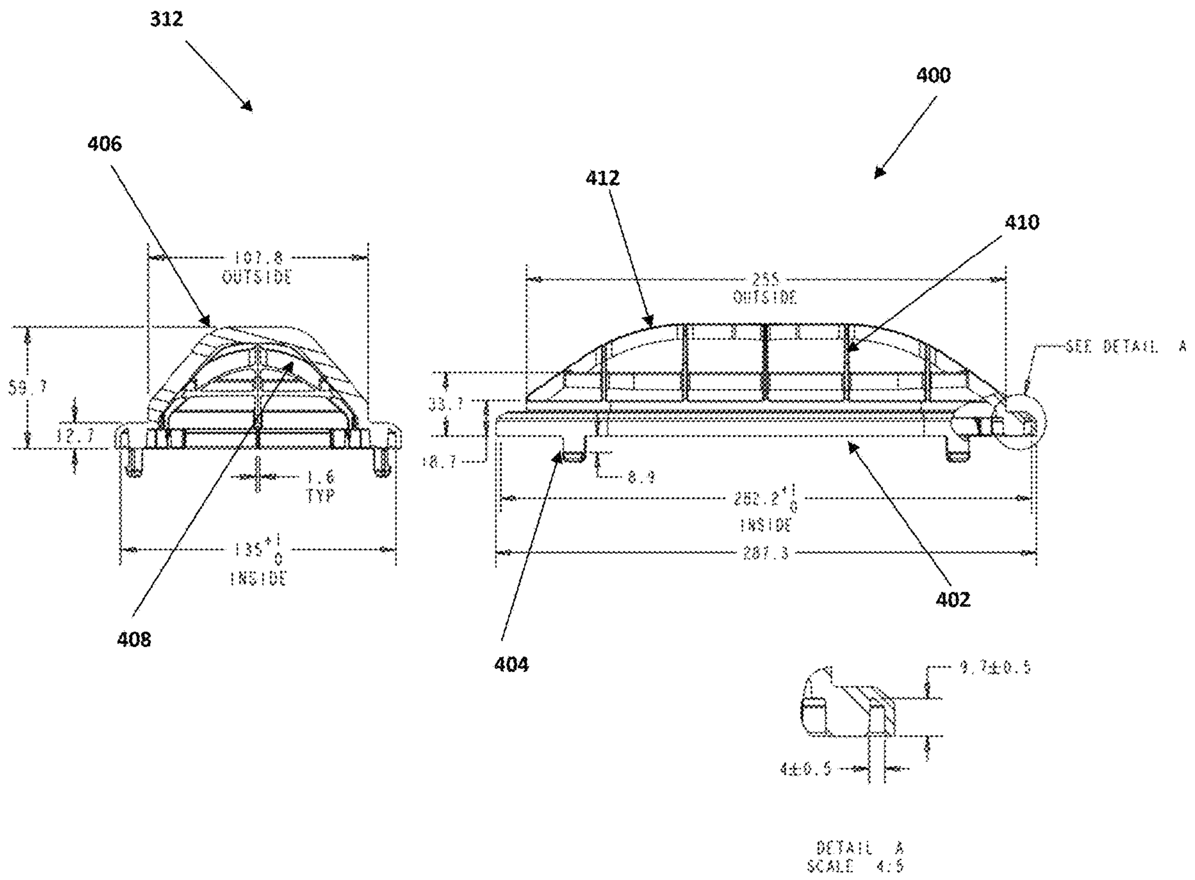
FIG. 4A depicts a guide cone shown in front and side perspective views, in accordance with an embodiment of the present subject matter.

Now referring to FIG. 4A, the guide cone 312 is shown in front and side perspective views. As depicted, the guide cone 312 comprises a conical cage-like structure 400 with a base 402. The guide cone 312 further comprises a plurality of mounting points 404 provided at the base 402 of the conical cage-like structure 400 to enable mounting of the guide cone 312 above the twin pre-cleaner design 310.

Again, referring to FIG. 4A, the conical cage-like structure 400 includes an upper guide cone 406 and a lower guide cone 408 formed integrally. The conical cage-like structure 400 also includes a plurality of vertical reinforcements 410 and a plurality of horizontal reinforcements 412. The upper guide cone 406, the lower guide cone 408, the plurality of vertical reinforcements 410 and the plurality of horizontal reinforcements 412 are shaped in a manner to fit with the hump hose 304.

Figure 4B:
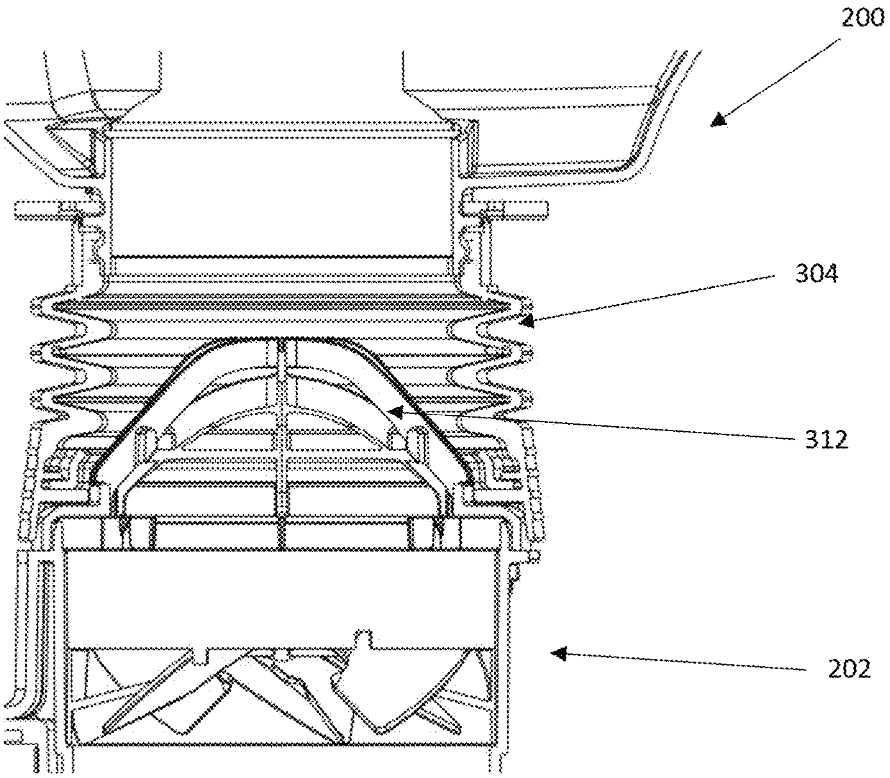
FIG. 4B depicts a guide cone causing alignment of hump hose, in accordance with an embodiment of the present subject matter.

Now referring to FIG. 4B, the guide cone 312 and the hump hose 304 are shown in an assembled state. As may be seen, the guide cone 312 causes correct alignment of the hump hose 304 during assembly of the first part 200 and the second part 202. In an embodiment of the present claimed subject matter, the guide cone 312 causes correct alignment of the hump hose 304 when the chassis 102 and the frame 104 of the vehicle 100 are being attached together.

Figure 4C:
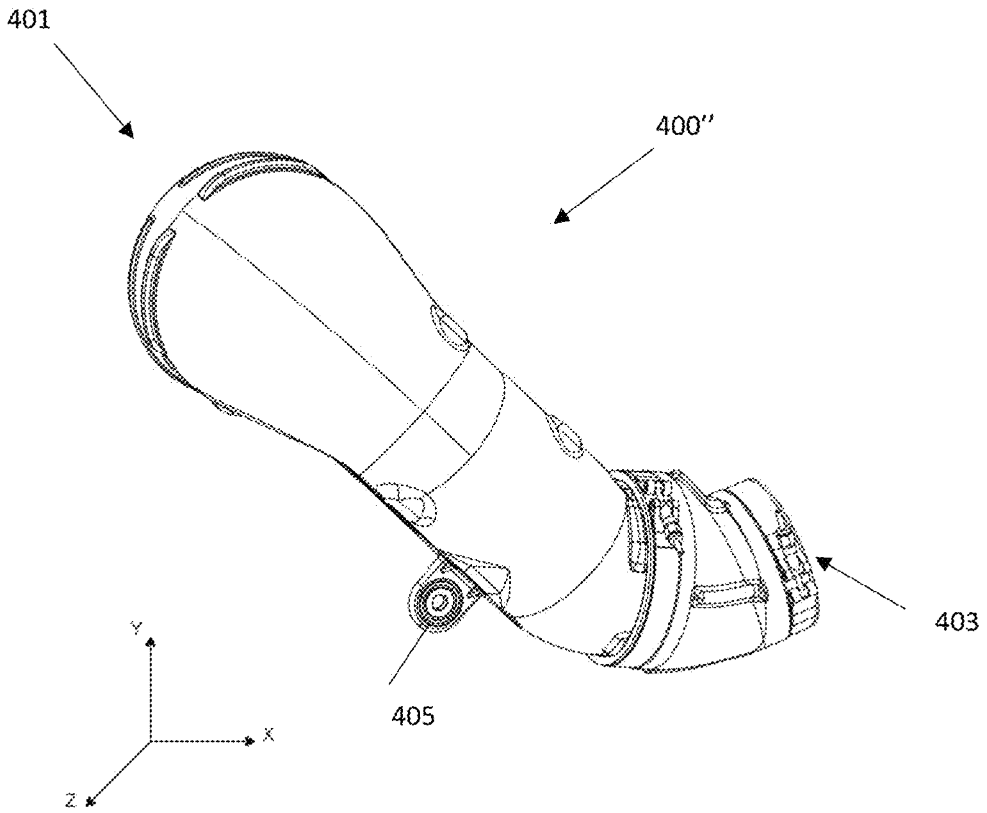
FIG. 4C depicts a segment of the plurality of segments in the air conduit in an air intake system, in accordance with an embodiment of the present subject matter.

Now referring to FIG. 4C, this illustrates a segment of the plurality of segments in the air conduit 101 in accordance with an embodiment of the present claimed subject matter. The segment of the plurality of segments may be either a notional segment or a physical segment, but for sake of description of FIG. 4C, the segment would be considered as a physical segment and would be referred to as a third section 400".

In an embodiment of the present claimed subject matter, the third section 400" of the air conduit 101 may be provided with a fifth end 401 and a sixth end 403. The fifth end 401 of the third section 400" may be connected with the fourth end 303 of the second section 300" via the third hose.

Further, the third section 400" may extends vertically along y-axis of the air conduit 101. In an exemplary embodiment of the present claimed subject matter, the third section 400" may be in a skewed 'S' shape with a plurality of curves.

In an embodiment of the present claimed subject matter, the third section 400" may have a length in a range from 300 mm to 1000 mm. In a preferred embodiment of the present claimed subject matter, the third section 400" may have a length of 400 mm. Further, the third section 400" may have a diameter in a range from 100 mm to 200 mm. In a preferred embodiment of the present claimed subject matter, the third section 400" may have a different diameter of the fifth end 401 and the sixth end 403, such that the fifth end 401 has a diameter of 180 mm and the sixth end 403 has a diameter of 103 mm. In another embodiment of the present claimed subject matter, the plurality of curves in the third section 400" may have one or more pre-defined angles in a range from 20 degrees to 120 degrees. In a preferred embodiment of the present claimed subject matter, the third section 400" may bend at an angle of 90 degrees along y-axis at a distance of 300 mm from the fifth end 401 and again bends at an angle of 62 degrees along x-axis at a distance of 200 mm from the fifth end 401.

In another embodiment of the present claimed subject matter, the third section 400" may be provided with a fourth collar 405. In another embodiment of the present claimed subject matter, the fourth collar 405 may be one of molded, press fitted or fastened by screw with the third section 400" of the air conduit 101. Further, the fourth collar 405 may be provided at a predetermined distance from the sixth end 403 of the third section 400".

In another embodiment of the present claimed subject matter, the sixth end 403 of the third section 400" may be same as outlet end 105 of the air conduit 101, such that the sixth end 403 may be detachably coupled with the turbocharger via a fourth hose. In another embodiment, the sixth end 403 may be detachably coupled with the engine via the fourth hose. The fourth hose may be a hose reducer. Further, the fourth hose may be coupled to the third section 400" of the air conduit 101 via a clamp. In another embodiment of the present claimed subject matter, the clamp may be a T-clamp. Furthermore, the third section 400" of the air conduit 101 may be mounted on a flywheel via one or more brackets, such that one end of the bracket may be coupled with the fourth collar 405 and the other end may be coupled with the flywheel. In another embodiment of the present claimed subject matter, one or more brackets may be coupled with the fourth collar 405 and the flywheel by a screw mechanism and the one or more brackets may be coupled to the flywheel via the damper.

FIGS. 4A, 4B, and 4C are merely an example. A person skilled in the art will recognize many variations, alternatives, and modifications of the embodiments of the present claimed subject matter.

Figure 5:
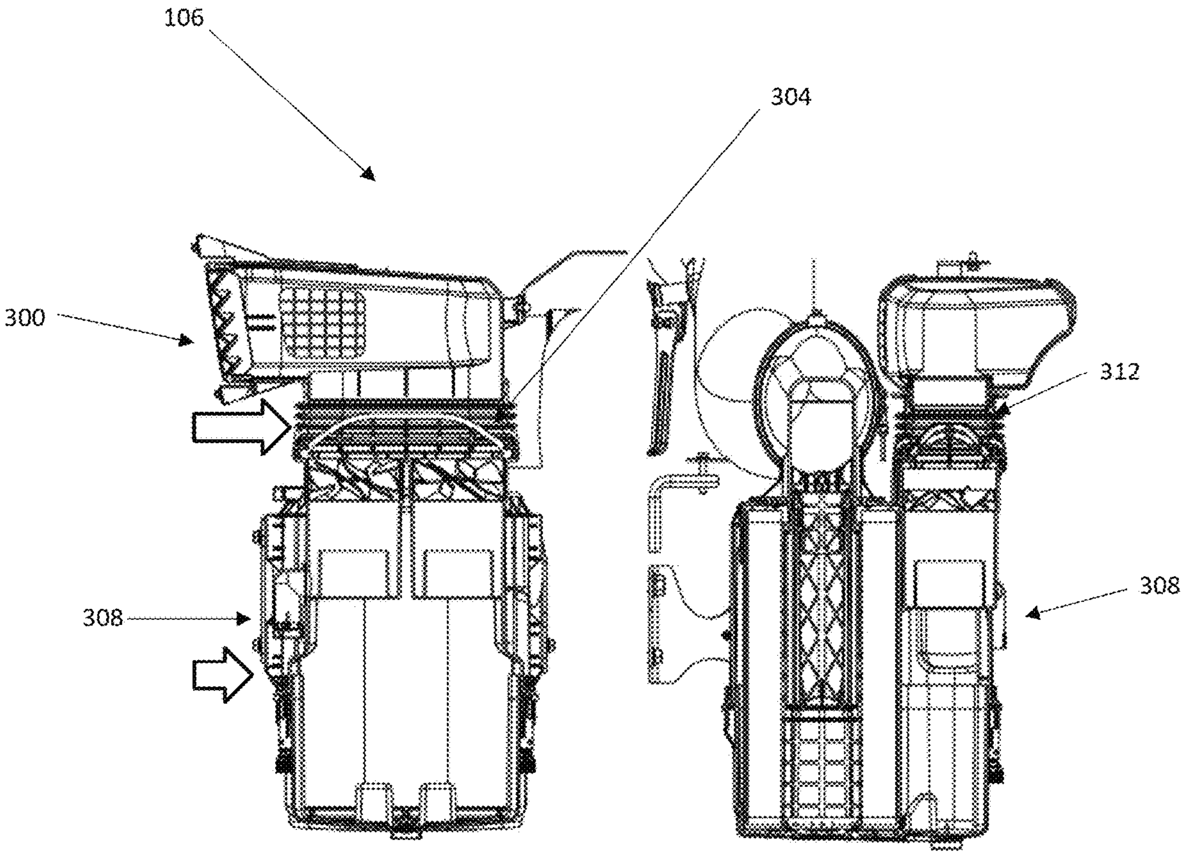
FIG. 5 illustrates front and side perspective views of the air filter assembly in an assembled state, in accordance with another exemplary embodiment of the present subject matter.

Moving on to FIG. 5, this illustrates front and side perspective views of the air filter assembly 106 in an assembled state when the chassis 102 and the frame 104 are attached together. In all embodiments of the present disclosure, the guide cone 312 of the integrated pre-cleaner and air filter assembly 308 causes alignment of the hump hose 304 during assembly of the modular snorkel system 300 mounted to the frame 104 with the integrated pre-cleaner and air filter assembly 308 mounted to the chassis 102.

In another aspect of the present claimed subject matter, the present invention discloses a structure of the air conduit 101, placed below the cabin that maintains the air pressure in the air conduit 101, while safely housing the air conduit 101 in confined space. Specifically, the length, diameter and angle of bending of various segments of the air conduit 101 contribute to a low resistance passage for the filtered air, amounting to maintenance of air pressure. Additionally, the structure disclosed by the present claimed subject matter is formed to accommodate in confined space between the air filter 108 and the turbocharger, below the cabin of the vehicle. Therefore, the air conduit 101 of air intake system disclosed in the present claimed subject matter provides a two-fold advantage of maintaining an optimum pressure of the filtered air and accommodating the air conduit 101 in a confined space.

Figure 6:
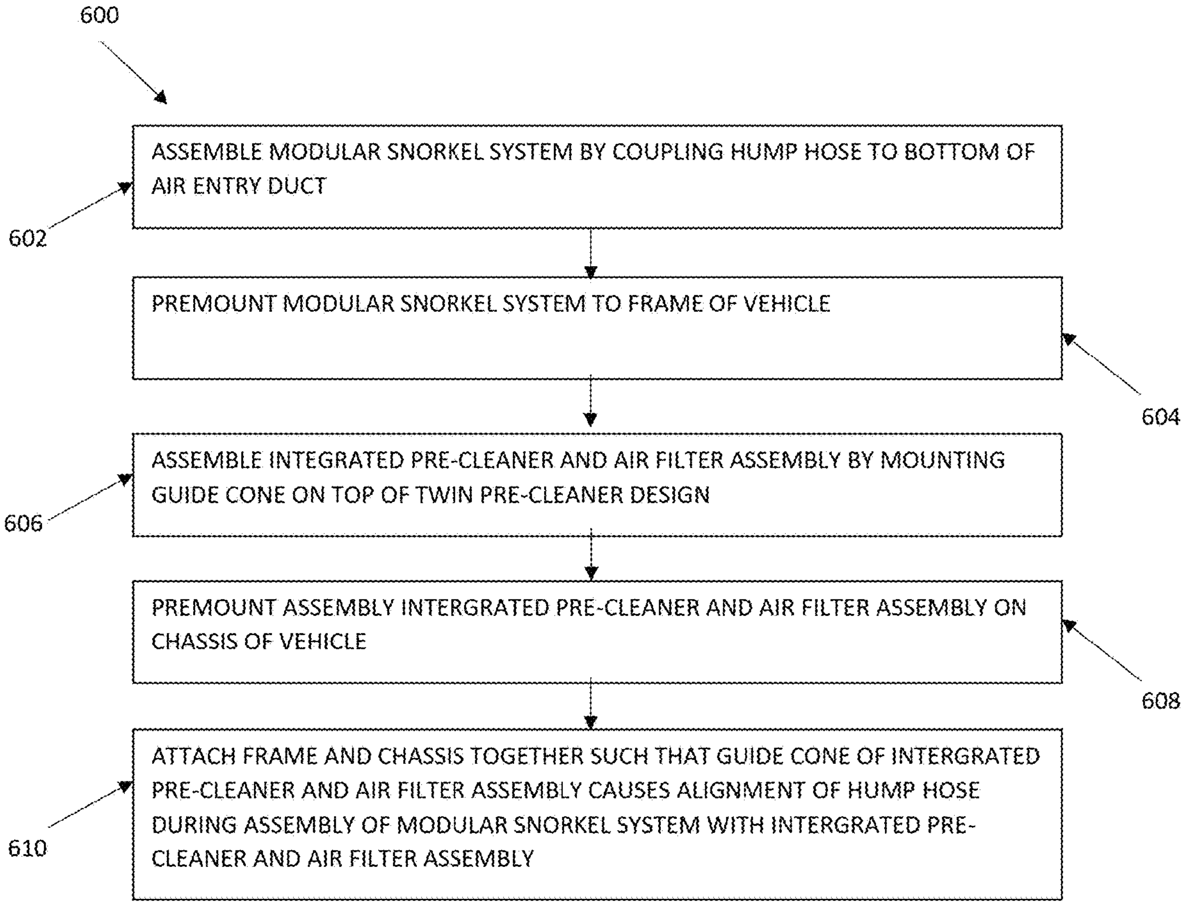
FIG. 6 depicts a method for assembling an air filter assembly for a vehicle having a frame and a chassis, the air filter assembly having a modular snorkel system and an integrated pre-cleaner and air filter assembly, in accordance with an exemplary embodiment of the present subject matter.

Moving on to FIG. 6, a method 600 for assembling the air filter assembly 106 for the vehicle 100 having the chassis 102 and the frame 104 is disclosed. The air filter assembly 106 having the modular snorkel system 300 and the integrated pre-cleaner and air filter assembly 308. The method comprises the first step 602 of assembling the modular snorkel system 300 by coupling the hump hose 304 to the bottom 306 of the air entry duct 302. The method 600 includes a second step 604 of pre-mounting the modular snorkel system 300 to the frame 104 of the vehicle 100. The method 600 further includes a third step 606 of assembling the integrated pre-cleaner and air filter assembly 308 by mounting the guide cone 312 on the top 314 of the twin pre-cleaner design 310.

Furthermore, referring to FIG. 6 again, the method 600 also includes a fourth step 608 of mounting the assembled integrated pre-cleaner and air filter assembly 308 to the chassis 102 of the vehicle 100. The method 600 further includes a fifth step 610 of attaching the frame 104 and the chassis 102 together such that the guide cone 312 causes alignment of the hump hose 304 during assembly of the modular snorkel system 300 with the integrated pre-cleaner and air filter assembly 308.

FIG. 6 is merely an example. A person skilled in the art will recognize many variations, alternatives, and modifications of the embodiments of the present disclosure.

Figure 7:
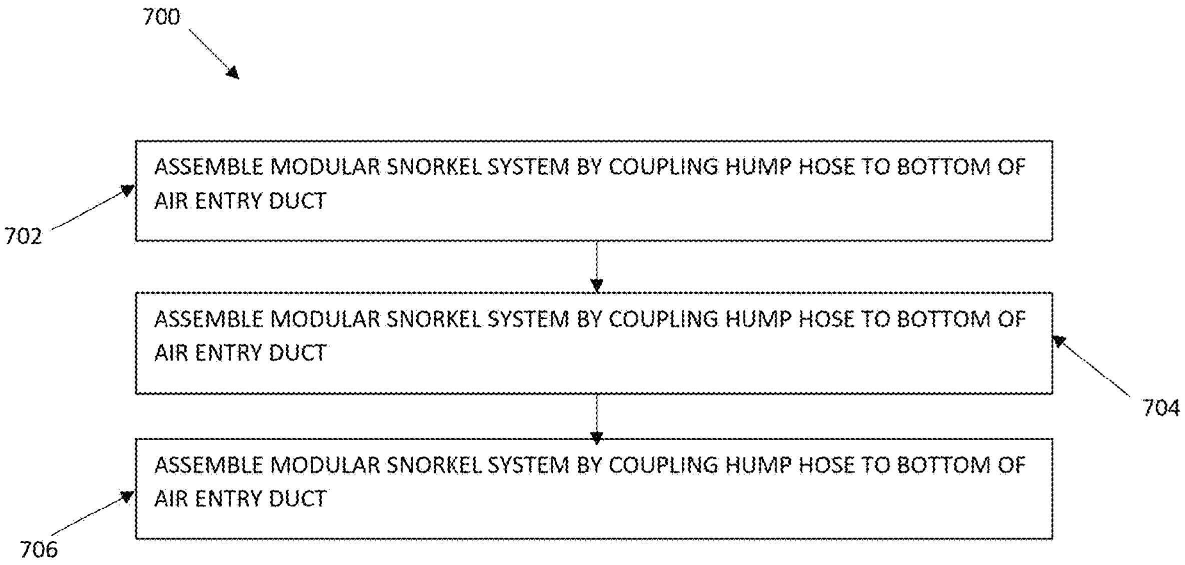
FIG. 7 illustrates a method for assembling a vehicle having a frame and a chassis, in accordance with another exemplary embodiment of the present subject matter.

Now referring to FIG. 7, a method 700 for assembling a vehicle 100 having a frame 104 and a chassis 102 is illustrated. The method 700 comprises the first step 702 of pre-mounting the modular snorkel system 300 to the frame 104 of the vehicle 100. The method 700 further comprises the second step 704 of pre-mounting the integrated pre-cleaner and air filter assembly 308 on the chassis 102 of the vehicle 100. The method also includes the third step 706 of attaching the frame 104 and the chassis 102 together such that the modular snorkel system 300 is assembled with the integrated pre-cleaner and air filter assembly 308.

FIG. 7 is merely an example. A person skilled in the art will recognize many variations, alternatives, and modifications of the embodiments of the present disclosure.

Embodiments of the present disclosure can be used for various purposes, including, though not limited to, manufacturing and servicing of the internal combustion engines.

What is claimed is:

1. An air intake system for a vehicle comprising:
an air filter assembly, and
an air conduit,
wherein, the air filter assembly comprises:
a first part of the air filter assembly mounted to a frame of the vehicle; and
a second part of the air filter assembly mounted to a chassis of the vehicle;
characterized in that:
the attachment of the frame and the chassis together causes assembly of the first part and the second part of the air filter assembly; and
wherein the air conduit comprises:
an inlet end coupled to an air filter;
an outlet end, opposite of the inlet end, and coupled to a turbocharger;
wherein the air conduit extends horizontally between the inlet end and the outlet end and comprises a plurality of segments such that a first segment of the plurality of segments bends at one or more predefined angles to couple to a second segment of the plurality of segments,
wherein the first part comprises a modular snorkel system, the modular snorkel system comprising:
an air entry duct; and
a hump hose coupled to the bottom of the air entry duct;
wherein the second part comprises an integrated pre-cleaner and air filter assembly, the integrated pre-cleaner and air filter assembly comprising:
a twin pre-cleaner design; and
a guide cone mounted on the top of the twin pre-cleaner design.

2. The air intake system as claimed in claim 1, wherein the guide cone comprises a conical cage-like structure; and wherein the guide cone causes alignment of the hump hose during assembly when the frame and chassis of the vehicle are being attached together.

3. The air intake system as claimed in claim 1, wherein the air conduit is a single structure with a plurality of demarcations, each demarcation of the plurality of demarcations corresponds to at least one segment of the plurality of segments.

4. The air intake system as claimed in claim 1, wherein the air conduit comprises a plurality of physical segments detachably coupled to each other.

5. The air intake system as claimed in claim 4, wherein the first segment of plurality of segments is coupled to the second segment of plurality of segments by one of: a hump hose and a straight hose.

6. The air intake system as claimed in claim 4, wherein one of: the first segment and the second segment of the plurality of segments has a length in a range from 300 mm to 1000 mm.

7. The air intake system as claimed in claim 4, wherein one of: the first segment and the second segment of the plurality of segments has a diameter in a range from 100 mm to 200 mm.

8. The air intake system as claimed in claim 1, wherein the one or more predefined angles are in a range from 20 to 120 degrees.

9. The air intake system as claimed in claim 8, wherein the one or more predefined angles facilitate flow of air in the air conduit at a pressure within a range from 8 inches of water column to 20 inches of water column.

10. The air intake system as claimed in one of claims 3 and 4, wherein at least one segment of the plurality of segments is in one of: “Z” shape, “L” shape, “S” shape, and skewed “S” shape.

11. The air intake system as claimed in one of claims 3 and 4, wherein at least one segment of the plurality of segments has one or more sensors and one or more compressor ports mounted thereon.

12. The air intake system as claimed in claim 11, wherein the one or more sensors comprise at least one of: a mass flow sensor, a pressure sensor, and a temperature sensor.

13. The air intake system as claimed in one of claims 3 and 4, wherein at least one segment of the plurality of segments extends along one of: X axis, Y axis, and Z axis of the air conduit.

14. The air intake system as claimed in claim 1, wherein the inlet end is coupled to the air filter via a straight hose.

15. The air intake system as claimed in claim 1, wherein the outlet end is coupled to the turbocharger via a hose reducer.

16. The air intake system as claimed in claim 1, wherein the air conduit is mounted on a chassis of a vehicle by way of one or more brackets and one or more dampers.

17. An air filter assembly for a vehicle having a frame and a chassis, the air filter assembly comprising:
a modular snorkel system mounted to the frame of the vehicle, the modular snorkel system comprising:
an air entry duct; and
a hump hose coupled to the bottom of the air entry duct; and
an integrated pre-cleaner and air filter assembly mounted on the chassis of the vehicle, the integrated pre-cleaner and air filter assembly comprising:
a twin pre-cleaner design; and
a guide cone mounted on the top of the twin pre-cleaner design;
characterized in that:
the guide cone comprises a conical cage-like structure; and
the guide cone causes alignment of the hump hose during assembly when the frame and the chassis of the vehicle are being attached together.

18. The air filter assembly as claimed in claim 17, wherein the guide cone further comprises a plurality of mounting points provided at the base of the conical cage-like structure to enable mounting of the guide cone above the twin pre-cleaner design.

19. The air filter assembly of claim 17, wherein the conical cage-like structure includes an upper guide cone and a lower guide cone formed integrally and a plurality of vertical and horizontal reinforcements.

20. A vehicle comprising:
a frame;
a chassis configured to attach to the frame;
an air filter assembly, and
an air conduit,
wherein, the air filter assembly comprises:
a first part of the air filter assembly mounted to a frame of the vehicle; and
a second part of the air filter assembly mounted to a chassis of the vehicle;
characterized in that:

the attachment of the frame and the chassis together causes assembly of the first part and the second part of the air filter assembly; and wherein the air conduit comprises:

an inlet end (104) coupled to an air filter;

an outlet end (106), opposite of the inlet end, and coupled to a turbocharger;

wherein the air conduit extends horizontally between the inlet end and the outlet end and comprises a plurality of segments such that a first segment of the plurality of segments bends at one or more predefined angles to couple to a second segment of the plurality of segments wherein the first part comprises a modular snorkel system, the modular snorkel system comprising:

an air entry duct; and a hump hose coupled to the bottom of the air entry duct;

wherein the second part comprises an integrated pre-cleaner and air filter assembly, the integrated pre-cleaner and air filter assembly comprising:

a twin pre-cleaner design; and a guide cone mounted on the top of the twin pre-cleaner design.

* * * * *